(12) United States Patent
Emlemdi

(10) Patent No.: US 7,341,964 B2
(45) Date of Patent: Mar. 11, 2008

(54) DURABLE GLASS AND GLASS ENAMEL COMPOSITION FOR GLASS COATINGS

(75) Inventor: Hasan B. Emlemdi, Hamilton, OH (US)

(73) Assignee: Shepherd Color Company, Cincinnati, OH (US)

( * ) Notice: Subject to any disclaimer, the term of this patent is extended or adjusted under 35 U.S.C. 154(b) by 258 days.

(21) Appl. No.: 11/192,151

(22) Filed: Jul. 28, 2005

(65) Prior Publication Data

US 2006/0025298 A1    Feb. 2, 2006

Related U.S. Application Data

(60) Provisional application No. 60/592,457, filed on Jul. 30, 2004.

(51) Int. Cl.
*C03C 8/04* (2006.01)
*C03C 8/14* (2006.01)
*C03C 8/16* (2006.01)

(52) U.S. Cl. ............... 501/26; 501/14; 501/15; 501/17; 501/21; 501/63

(58) Field of Classification Search .......... 501/14, 501/15, 17, 21, 26, 63
See application file for complete search history.

(56) References Cited

U.S. PATENT DOCUMENTS

| | | | |
|---|---|---|---|
| 2,409,412 A | 10/1946 | Armistead, Jr. | |
| 2,786,782 A | 3/1957 | Zimmerman et al. | |
| 4,043,824 A | 8/1977 | Wagar | |
| 4,361,654 A | 11/1982 | Ohmura et al. | |
| 4,493,900 A | 1/1985 | Nishino et al. | |
| 4,537,862 A | 8/1985 | Francel et al. | |
| 4,822,396 A | 4/1989 | Reinherz et al. | |
| 4,859,637 A | 8/1989 | Roberts | |
| 4,937,063 A | 6/1990 | Sullivan | |
| 4,970,178 A | 11/1990 | Klimas et al. | |
| 5,200,369 A | 4/1993 | Clifford et al. | |
| 5,304,516 A | 4/1994 | Clifford et al. | |
| 5,306,674 A | 4/1994 | Ruderer et al. | |
| 5,342,810 A | 8/1994 | Merigaud et al. | |
| 5,504,045 A | 4/1996 | Emlemdi et al. | |
| 5,616,417 A * | 4/1997 | Ryan | 428/428 |
| 5,674,789 A | 10/1997 | Anquetil | |
| 5,677,251 A | 10/1997 | Sakoske | |
| 5,843,853 A | 12/1998 | Heitmann et al. | |
| 6,087,282 A | 7/2000 | Panzera et al. | |
| 6,105,394 A | 8/2000 | Sridharan et al. | |
| 6,346,493 B1 | 2/2002 | Kniajer et al. | |
| 2006/0105900 A1 * | 5/2006 | Kasuga et al. | 501/78 |
| 2006/0148635 A1 * | 7/2006 | Miyauchi et al. | 501/65 |
| 2006/0172876 A1 * | 8/2006 | Emlemdi | 501/21 |
| 2007/0054794 A1 * | 3/2007 | Nagaoka et al. | 501/65 |

FOREIGN PATENT DOCUMENTS

| | | | |
|---|---|---|---|
| EP | 0 444 821 A1 | 9/1991 | |
| JP | 2001-139345 A * | 5/2001 | |

OTHER PUBLICATIONS

Kingery, W.D., et al., Introduction to Ceramics, 2nd Ed., Table of Contents, 1976, John Wiley & Sons, New York, no month.
Tanco (Tantalum Mining Corporation of Canada Limited), Informational Brochure, Oct. 2000, pp. 1-23, Lac du Bonnet, Manitoba, Canada.

* cited by examiner

*Primary Examiner*—Anthony J. Green
(74) *Attorney, Agent, or Firm*—Steven J. Goldstein; Frost Brown Todd LLC

(57) ABSTRACT

The present invention provides glass compositions and glass coating systems for use on glass substrates in several industrial applications. It relates to a lead-free and cadmium-free glass enamel coating made primarily by utilizing at least one or more of lead-free and cadmium-free glass compositions comprising in weight percent from about 26% to about 63% $SiO_2$, from about 2% to about 10.5% ZnO, from about 8% to about 20% $B_2O_3$, from about 0.1% to about 10% $Bi_2O_3$, up to about 12% $Na_2O$, from about 0.1% to about 17% $K_2O$, up to about 6% $Li_2O$, from about 0.1% to about 22% of $Ta_2O_5$, from about 0.0% to about 22% of $Nb_2O_5$, up to about 8% from each of $Al_2O_3$, $TiO_2$, $ZrO_2$, BaO and SrO, from about 0.1% to about 7% $Sb_2O_3$, up to about 7% $F_2$, up to about 4% from each of CaO, $Mo_2O_3$ and MgO, and from about 0.1% to about 4% of one or more of $La_2O_3$, $Nd_2O_3$, $Pr_2O_3$ and $Ce_2O_3$.

15 Claims, No Drawings

DURABLE GLASS AND GLASS ENAMEL COMPOSITION FOR GLASS COATINGS

CROSS-REFERENCE TO RELATED APPLICATION

This patent application is based upon and claims priority from U.S. Provisional Patent Application 60/592,457, Emlemdi, filed Jul. 30, 2004, incorporated herein by reference.

FIELD OF THE INVENTION

The present invention provides a new and improved durable environmentally friendly glass enamel system for glass coatings.

BACKGROUND OF THE INVENTION

Numerous glass enamel compositions that are lead-free and cadmium-free are known in the prior art.

In general, lead free glasses and lead free glass enamel compositions for glass coating systems reported in the prior art and prior literature can be categorized into two major, however rather broad, groups that are of interest to illustrate the importance and progression of the present invention. One group is often characterized as zinc-boro-silicate glasses. These types of glasses, even the ones claiming improved durability are often weaker in weathering the elements than their lead-containing counterparts. The other major group can be distinguished by its significant bismuth content. It is, therefore, very costly to produce this latter group, even though this group is often characterized as being better performing glass enamels. It is known to people familiar with these types of products that for decades the above-mentioned two major categories have been intended to displace the more forgiving, usually better performing, lead-containing materials which are now being phased out due to environmental and regulatory pressure.

An example of a prior art lead-free glass enamel may be found in Francel et al., U.S. Pat. No. 4,537,862, issued Aug. 27, 1985. Francel et al. discloses a glass enamel including a frit comprising by weight 25-32% $SiO_2$, 25-32% $B_2O_3$, 10-18% $ZrO_2$, 0-9% $Na_2O$, 0-5% $K_2O$, 0-9% $Li_2O$, 0-2% $SnO_2$, 0-3% $CaO$, 0-6% $SrO$, and 10-18% rare earth oxide, wherein the ratio of $ZrO_2$ to rare earth oxide is about 1:1 to 1.4:1, the amount of $ZrO_2$ plus rare earth oxide is about 20% to 33%, and the amount of $Li_2O$, $K_2O$ and $Na_2O$ is about 1% to 10%. Another example of a prior art lead-free glass enamel may be found in Roberts, U.S. Pat. No. 4,859,637, issued Aug. 22, 1989. Roberts discloses a lead-free glass enamel including a frit comprising by weight 19-45% $SiO_2$, 20-33% $B_2O_3$, 0-10% $ZrO_2$, 8-15% alkali metal oxide, 0-35% $ZnO$, 0-6% $Al_2O_3$, 0-3% $BaO$, 0-8% $P_2O_5$, 0-6% $La_2O_3$, and 2-10% $F_2$. Klimas et al., in U.S. Pat. No. 4,970,178, issued Nov. 13, 1990, teaches the inclusion of $Bi_2O_3$ in a lead-free glass enamel/glaze including a frit comprising by mole 45-60% $SiO_2$, 6-13% $B_2O_3$, 0-6% $ZrO_2$, 5-14% $Na_2O$, 0-8% $K_2O$, 0.0-5% $Li_2O$, 8-25% $ZnO$, 0-8% $CaO$, 0-8% $SrO$, 0-10% $Bi_2O_3$, 0-4% $Al_2O_3$, 0-9% $BaO$, 0-7% $TiO_2$, and 0-1% $WO_3$.

Another example of a prior art lead-free glass enamel may be found in Emlemdi et al., U.S. Pat. No. 5,504,045, issued Apr. 2, 1996. Emlemdi et al. teaches that excellent scratch resistance and other desirable properties can be attained by a lead-free glass enamel including a frit comprising by mole 8.5-15.6% $SiO_2$, 27.4-36.45% $B_2O_3$, 7.5-12.1% $Na_2O$, 1.2-2.4% $K_2O$, 0.0% $Li_2O$, 1-2.6% $MgO$, 3.4-5.5% $CaO$, 0.5-1.4% $SrO$, 28.1-38.5% $ZnO$, 0.6-1.9% $Al_2O_3$, 0.9-2.2% $P_2O_5$, and 2.6-4.3% $F_2$. A more recent example of a prior art lead-free glass enamel may be found in Kniajer et al., U.S. Pat. No. 6,346,493, issued Feb. 12, 2002. Kniajer et al. discloses a lead-free glass enamel including a frit comprising by weight 28-60% $SiO_2$, 9-21% $B_2O_3$, 0-11% $ZrO_2$, 0-15% $Na_2O$, 0-13% $K_2O$, 0-6% $Li_2O$, 5-22% $ZnO$, 0-5% $CaO$, 0-2% $MgO$, 0-8% $SrO$, 0-9% $Bi_2O_3$, 0-6% $Al_2O_3$, 0-20% $Nb_2O_5$, 0-25% $TiO_2$, 0-12% $BaO$, 0-6% $Sb_2O_3$, 0-5% $LnOx$, and 0-6% $F_2$.

SUMMARY OF THE INVENTION

In addition to being a lead-free and cadmium-free glass frit and glass enamel composition, the present invention is unique in the fact that it contains minimum amounts of $Bi_2O_3$ giving this invention the overall added benefit of cost reduction. Furthermore, this invention introduces the benefit of adding $Ta_2O_5$ into the mainly zinc-borosilicate glass formulations. Those formulations are also characterized by containing minimal amounts of $Bi_2O_3$, in addition to the rest of the specified ingredients.

The glass component in the present invention includes one or more glass frits containing, in weight percent, from about 26% to about 63% $SiO_2$, from about 2% to about 10.5% $ZnO$, from about 8% to about 20% $B_2O_3$, from about 0.1% to about 10% $Bi_2O_3$, up to about 12% $Na_2O$, from about 0.1% to about 17% $K_2O$, up to about 6% $Li_2O$, from about 0.1% to about 22% of $Ta_2O_5$, from about 0% to about 22% of $Nb_2O_5$, up to about 8% from each of $Al_2O_3$, $TiO_2$, $ZrO_2$, $BaO$ and $SrO$, from about 0.1% to about 7% $Sb_2O_3$, up to about 7% $F_2$, up to about 4% from each of $CaO$, $Mo_2O_3$ and $MgO$, and from about 0.1% to about 4% of one or more of $La_2O_3$, $Nd_2O_3$, $Pr_2O_3$ and $Ce_2O_3$.

In an intermediate range, the glass component in this invention includes one or more glass frits containing, in weight percent, from about 28% to about 60% $SiO_2$, from about 3% to about 10.5% $ZnO$, from about 9% to about 19% $B_2O_3$, up to about 8% $Na_2O$, up to about 6% from each of $BaO$, $SrO$, $Al_2O_3$, $TiO_2$ and $ZrO_2$, from about 0.1% to about 15% $K_2O$, from about 0.1% to about 7% $Bi_2O_3$, from about 0.25% to about 4.5% $Li_2O$, from about 0.1% to about 16% of $Ta_2O_5$, from about 0% to about 16% of $Nb_2O_5$, up to about 5% $F_2$, from about 0.1% to about 5% $Sb_2O_3$, up to about 3% from each of $CaO$, $Mo_2O_3$ and $MgO$, and from about 0.1% to about 3% of one or more of $La_2O_3$, $Nd_2O_3$, $Pr_2O_3$ and $Ce_2O_3$.

In a more preferred range, the glass component in this invention includes one or more glass frits containing, in weight percent, from about 30% to about 56% $SiO_2$, from about 4% to about 10% $ZnO$, from about 10% to about 18% $B_2O_3$, from about 0.1% to about 5% from each of $Na_2O$, $Al_2O_3$, $TiO_2$ and $ZrO_2$, from about 0.25% to about 13.5% $K_2O$, from about 0.25% to about 3% $Bi_2O_3$, from about 0.5% to about 3% $Li_2O$, from about 0.25% to about 11% of $Ta_2O_5$, from about 0% to about 11% of $Nb_2O_5$, up to about 4% from each of $BaO$ and $SrO$, from about 0.25% to about 3.5% $Sb_2O_3$, from about 0.1% to about 3.5% $F_2$, up to about 2% from each of $CaO$, $Mo_2O_3$ and $MgO$, and from about 0.25% to about 2% of one or more of $La_2O_3$, $Nd_2O_3$, $Pr_2O_3$ and $Ce_2O_3$.

In each of these broad, intermediate and more preferred ranges, the products of this invention may include the coloring oxides (including but not limited to $CuO$, $CO_2O_3$, $MnO_2$, $Fe_2O_3$, $NiO$, $Cr_2O_3$, $V_2O_5$) as an optional addition to give colors other than the more popular lighter colors. The ranges at which these materials are generally used are set forth in the attached table.

DETAILED DESCRIPTION OF THE INVENTION

This invention relates to a glass enamel coating system that exhibits excellent acid resistance, good adhesion to glass substrates, and a clear texture allowing it to be colored at will by utilizing the desired/adequate pigmentation. The materials also have a functional maturation temperature and a substrate-compatible coefficient of thermal expansion.

The present invention includes small amounts of $Bi_2O_3$, from about 0.1% to about 10% $Bi_2O_3$ in the broad range, and from about 0.25% to about 3% $Bi_2O_3$ in the more preferred range. This provides the added advantage of a more cost-effective glass enamel. More significantly, this invention is a pioneer in the utilization of $Ta_2O_5$ in the lead-free and cadmium-free glass frits and glass enamel compositions to provide several desirable properties. An important aspect of this invention is the discovery that the inclusion of tantalum oxide or other sources of tantalum oxide in the compositions of the present invention at from about 0.1% to about 22% $Ta_2O_5$ in the broad range, and from about 0.25% to about 11% $Ta_2O_5$ in the more preferred range results in improved properties. It must be noted that not much $Ta_2O_5$ is needed to enhance the glass properties, thus maintaining the advantage of a more cost-effective glass enamel. Without intending to be bound by theory, it is believed that the presence of the tantalum oxide provides a strengthening of the resultant glass enamel presumably via inhibiting the migration of mobile species.

The glass frit compositions that are lead-free and cadmium-free utilized for glass enamel coating systems according to the present invention have the added advantages of being more durable, clearer, glossier, and slightly softer than conventional glass enamel coatings. Moreover, this invention teaches that suitable and durable glass can be attained even without the incorporation of $Nb_2O_5$, provided the other defined components of the present invention are utilized. This is in contrast to recent work done on similar and non similar systems utilizing $Nb_2O_5$. Thus, preferred compositions of the present invention are substantially free of $Nb_2O_5$.

A glass frit or glass frits made in accordance with the principles of the present invention are processed according to the established art of frit making. This means that a frit according to this invention can be prepared by mixing together the proper raw materials which are, individually, well known to those skilled in the art. The raws are then melted in a furnace prepared for glass making or in sintered fused silica crucibles at temperatures between about 2000° F. (1090° C.) and about 2250° F. (1230° C.), for about 1 hour. The exact smelting time largely depends on the batch size. Attention should also be paid to fluorine volatilization. The molten glass can be quenched into a water pool with the help of a stream of water, which is known as "water quench" process, or quenched through two water-cooled metal drums which is known as "roll quench" process. The product frits are then ground and dried into a suitable average particle size dry flux. Such techniques are well known to those skilled in the art.

This invention relates to unique lead-free glass frits. The compositions which these materials generally have are set forth in the following table:

|   |   | BROAD RANGE | | INTER-MEDIATE | | PREFERRED | |
|---|---|---|---|---|---|---|---|
|   |   | from about | to about | from about | to about | from about | to about |
| $Li_2O$ | Lithium oxide | 0.00 | 6.00 | 0.25 | 4.50 | 0.50 | 3.00 |
| $K_2O$ | Potassium oxide | 0.10 | 17.00 | 0.10 | 15.00 | 0.25 | 13.50 |
| $Na_2O$ | Sodium oxide | 0.00 | 12.00 | 0.00 | 8.00 | 0.10 | 5.00 |
| CaO | Calcium oxide | 0.00 | 4.00 | 0.00 | 3.00 | 0.00 | 2.00 |
| MgO | Magnesium oxide | 0.00 | 4.00 | 0.00 | 3.00 | 0.00 | 2.00 |
| SrO | Strontium oxide | 0.00 | 8.00 | 0.00 | 6.00 | 0.00 | 4.00 |
| BaO | Barium oxide | 0.00 | 8.00 | 0.00 | 6.00 | 0.00 | 4.00 |
| ZnO | Zinc oxide | 2.00 | 13.00 | 3.00 | 13.00 | 4.00 | 10.50 |
| $Al_2O_3$ | Alumina oxide | 0.00 | 8.00 | 0.00 | 6.00 | 0.10 | 5.00 |
| $B_2O_3$ | Boron trioxide | 8.00 | 20.00 | 9.00 | 19.00 | 10.00 | 18.00 |
| $Sb_2O_3$ | Antimony trioxide | 0.10 | 7.00 | 0.10 | 5.00 | 0.25 | 3.50 |
| $SiO_2$ | Silica | 26.00 | 63.00 | 28.00 | 60.00 | 30.00 | 56.00 |
| $TiO_2$ | Titanium dioxide | 0.00 | 8.00 | 0.00 | 6.00 | 0.10 | 5.00 |
| $ZrO_2$ | Zirconium dioxide | 0.00 | 8.00 | 0.00 | 6.00 | 0.10 | 5.00 |
| $F_2$ | Fluorine | 0.00 | 7.00 | 0.00 | 5.00 | 0.10 | 3.50 |
| $Bi_2O_3$ | Bismuth trioxide | 0.10 | 10.00 | 0.10 | 7.25 | 0.25 | 3.00 |
| $Ta_2O_5$ | Tantalum oxide | 0.10 | 22.00 | 0.10 | 16.00 | 0.25 | 11.00 |
| $Nb_2O_5$ | Niobium oxide | 0.00 | 22.00 | 0.00 | 16.00 | 0.00 | 11.00 |
| $Mo_2O_3$ | Molybdenum trioxide | 0.00 | 4.00 | 0.00 | 3.00 | 0.00 | 2.00 |
| $Ce_2O_3$ | Cerium oxide* | 0.10 | 4.00 | 0.10 | 3.00 | 0.25 | 2.00 |
| $Nd_2O_5$ | Neodymium trioxide* | | | | | | |
| $La_2O_3$ | Lanthanum oxide* | | | | | | |
| $Pr_2O_3$ | Praseodymium trioxide* | | | | | | |
| $V_2O_5$ | Vanadium pentoxide** | 0.00 | 6.00 | 0.10 | 4.00 | 0.25 | 2.00 |
| $Cr_2O_3$ | Chromium oxide** | | | | | | |
| $MnO_2$ | Manganese dioxide** | | | | | | |
| $Co_2O_3$ | Cobalt oxide** | | | | | | |
| CuO | Copper oxide** | | | | | | |
| $Fe_2O_3$ | Iron oxide** | | | | | | |
| NiO | Nickel oxide** | | | | | | |

*Required additional oxide
**Optional additional coloring oxide

The following formulations are examples of glass enamel frit compositions of this invention. They are intended to be exemplary only and are not limiting of the scope of the present invention.

FORMULATIONS

|  |  | Example 1 | Example 2 | Example 3 | Example 4 |
|---|---|---|---|---|---|
| $Li_2O$ | Lithium oxide | 2.80 | 2.80 | 0.00 | 0.00 |
| $K_2O$ | Potassium oxide | 12.50 | 13.15 | 6.50 | 13.00 |
| $Na_2O$ | Sodium oxide | 0.25 | 0.00 | 10.00 | 5.00 |
| MgO | Magnesium oxide | 0.10 | 0.00 | 0.00 | 0.00 |
| SrO | Strontium oxide | 0.10 | 0.00 | 0.00 | 0.00 |
| ZnO | Zinc oxide | 12.00 | 10.40 | 12.00 | 12.00 |
| $Al_2O_3$ | Alumina oxide | 0.10 | 0.15 | 0.10 | 0.15 |
| $B_2O_3$ | Boron trioxide | 13.00 | 13.50 | 13.50 | 13.00 |
| $Sb_2O_3$ | Antimony trioxide | 1.75 | 1.90 | 0.15 | 0.25 |
| $SiO_2$ | Silica | 51.00 | 53.80 | 53.40 | 52.50 |
| $TiO_2$ | Titanium dioxide | 2.75 | 2.90 | 0.00 | 0.00 |
| $F_2$ | Fluorine | 0.10 | 0.10 | 2.75 | 3.00 |
| $Bi_2O_3$ | Bismuth trioxide | 0.75 | 0.75 | 1.25 | 0.55 |
| $Ta_2O_5$ | Tantalum oxide | 2.50 | 0.25 | 0.25 | 0.25 |
| $Ce_2O_3$ | Cerium oxide | 0.30 | 0.30 | 0.10 | 0.30 |
| $Nd_2O_3$ | Neodymium trioxide |  |  |  |  |
| $La_2O_3$ | Lanthanum oxide |  |  |  |  |
| $Pr_2O_3$ | Praseodymium trioxide |  |  |  |  |
| $V_2O_5$ | Vanadium pentoxide | 0.00 | 0.00 | 0.00 | 0.00 |
| $Cr_2O_3$ | Chromium oxide |  |  |  |  |
| $MnO_2$ | Manganese oxide |  |  |  |  |
| $Co_2O_3$ | Cobalt oxide |  |  |  |  |
| CuO | Copper oxide |  |  |  |  |
| $Fe_2O_3$ | Iron oxide |  |  |  |  |
| NiO | Nickel oxide |  |  |  |  |
| | Total | 100.00 | 100.00 | 100.00 | 100.00 |

This invention allows for glass frit(s) with suitable coefficient of thermal expansion (CTE) from about $65 \times 10^{-7}/°C$ to about $90 \times 10^{-7}/°C$. Such CTE values, in addition to the reasonable maturation temperature, allow the enamels of this invention to be applied at workable firing temperatures with minimal thermal stresses built up between the enamels and the glass substrate to which the product(s) is/are applied.

Those values are comparable to established workable products in the field as shown in the following table, which lists Coefficient of Thermal Expansion (CTE), Glass Transition Temperature (Tg) and Softening Point (SP) of several commercial glasses available from Glass Coating & Concepts (GCC), Monroe, Ohio. This table also lists the properties of a typical example of the present invention.

|  | CTE, $10^{-7}/°C$ | TG, °C | SP, °C | Overall Durability |
|---|---|---|---|---|
| GF 543* | 60-85 | 440-448 | 475-495 | Moderate-Weak |
| GF 584** | 65-90 | 440-482 | 480-500 | Weak |
| GF 602*** | 60-85 | 460-495 | 510-535 | Good |
| Example of current invention (Example 2) | 65-90 | 490-510 | 530-550 | Best |

*GF 543, Traditional leaded frit sold by GCC
**GF-584, Lead-free, nondurable, zinc-borosilicate glass frit sold by GCC
***GF-602, Lead free, durable, bismuth-borosilicate glass frit sold by GCC Those formulations of glass enamel frits are produced using conventional techniques. Such techniques include ball milling the melted compositions in a water solution to obtain an average particle size of from about 3.5 microns to about 7.5 microns as determined by a MICROTRAC® laser diffraction particle size analyzer at a 50% range. The slurry or solution of the milled glass frit is then dried utilizing one of the techniques that are well known to those skilled in the art.

The glass enamel portion in this invention includes the utilization of one or more of the glass fluxes described above in the making of enamel to suit the intended application. An enamel paste can be made by adding the dry flux or fluxes and other needed pigments into a conventional screen printing medium/vehicle. The present invention includes the utilization of other media as well. The medium of choice depends on the particular application technique being used. The different media include water-miscible media, thermoplastic media, spray media, roller-coater media, pad-transfer media, and UV-curable media. A typical example of such a medium is one known commercially as C474 that is manufactured and sold by GCC. Such paste is then applied to the glass substrate, whether it is a curved container or flat substrate, via screen printing or other application method again, such techniques are well known to those skilled in the art. The product(s) of this invention are suitable for various commercial glass coating applications.

Those compositions provide improved chemical durability and completely suitable product(s) for their intended use. For example, the enamels herein may be used on appliance parts, including refrigerator shelves and other appliance glassware, furniture glass, indoor glass barriers, including satin etches for walkways, shower doors and shower boards and the like, in glass coating applications. Chemical durability evaluations of several acids were done for the product(s) of this invention against both a typical lead-free, nondurable, zinc-borosilicate glass frit sold by GCC and a durable lead-free product commercially available from others. The procedures mentioned next were used for the evaluations, and the tables illustrate the results of those evaluations:

The citric and hydrochloric acid evaluations were carried out and graded in accordance with the ASTM C724-91 test procedure. The 0.1 N $H_2SO_4$ sulfuric acid evaluations were done by immersion into the mentioned acid for the specified length of time. The grading was, again, done based on the C724-91 grading scale using the following scale:

Grade 1=no attack apparent

Grade 2=appearance of iridescence or visible stain on the exposed surface when viewed at a 45% angle, but not apparent at angles less then 30%

Grade 3=definite stain which does not blur reflected images and is visible at angles less then 30%

Grade 4=definite stain with a gross color change or strongly iridescent surface visible at angles less than 30% and which may blur reflected images
Grade 5=surface dull or matte with chalking possible
Grade 6=significant removal of enamel with pinholing evident
Grade 7=complete removal of enamel in exposed area

|  | Acid Type/Exposure Time | |
| --- | --- | --- |
| Product Type | 10% Citric Acid/ 15 minutes* | 3.8% Hydrochloric Acid/ 5 minutes* |
| Commercial high durability lead-free frit | 2 | 2 |
| Currently available GCC zinc-based frit** | 5 | 5-6 |
| Present invention (Example 1) | 1 | 1 |

*Test done according to ASTM Test Procedure C724-91
**GF-584, lead-free, nondurable, zinc-borosilicate glass frit sold by GCC

| | 0.1 N $H_2SO_4$ Exposures at Room Temperature | | | |
| --- | --- | --- | --- | --- |
| | Exposure Time | | | |
| Product Type | 2 hours | 24 hours | 48 hours | 72 hours |
| Commercial high durability lead-free frit | 1-2 | 3 | 3-4 | 4 |
| Currently available GCC zinc-based frit** | 6-7 | 7 | 7 | 7 |
| Present invention (Example 1) | 1-2 | 1-2 | 2 | 2 |

It has also been discovered that utilizing frits made according to the present invention together with other known frits allows for use in additional applications to meet further application requirements. Such hybrid products may be suitable for use in, e.g., appliance applications, automotive applications, and possibly others. The following table gives typical formulations of example of glass enamel composition illustrating the usage of the newly invented glass and glass flux herein. This example only illustrates a small portion of the possibilities for such products. The example, itself, contains three different formulations. One of the examples also illustrates the above-mentioned fact that other established and already made glass flux products can be added to the product(s) of this invention to further meet certain application requirements.

| Enamel Formulation | A | B | C |
| --- | --- | --- | --- |
| Glass Flux 1* | 96.00 | | 50.00 |
| Glass Flux 2** | | 90.00 | |
| Glass Flux 3*** | | | 10.00 |
| Pigment (1)**** | 2.50 | 1.00 | |
| Pigment (2)**** | | 8.00 | 36.00 |
| Others**** | 1.50 | 1.00 | 4.00 |
| Total solids | 100% | 100% | 100% |

*Flux made according to this invention - Example 1
**Flux made according to this invention - Example 2
***Established flux, made by GCC - Flux 598
****Pigments are available from Shepherd Color Company - SCC CP-911-9B, GR0132 titania powder and SCC BL385, respectively The present invention includes the utilization of one or more of the glass fluxes described above in the making of enamel to suit particular applications. An enamel paste can be made by adding the dry flux or fluxes and other needed pigments into a conventional screen printing vehicle. Such paste is then applied to the glass substrate, whether it is a container or flat substrate, via screen printing. Again, such techniques are well known to those skilled in the art. The products of this invention are suitable for various commercial glass coatings applications.

What is claimed is:

1. A lead-free, glass frit consisting essentially of in percent by weight from about 26% to about 63% $SiO_2$, from about 2% to about 10.5% ZnO, from about 8% to about 20% $B_2O_3$, from about 0.1% to about 10% $Bi_2O_3$, up to about 12% $Na_2O$, from about 0.1% to about 17% $K_2O$, up to about 6% $Li_2O$, from about 0.1% to about 22% of $Ta_2O_5$, from about 0% to about 22% of $Nb_2O_5$, up to about 8% of each of $Al_2O_3$, $TiO_2$, $ZrO_2$, BaO and SrO, from about 0.1% to about 7% $Sb_2O_3$, up to about 7% F, up to about 4% of each of CaO, $Mo_2O_3$ and MgO, and from about 0.1% to about 4% of one or more of $La_2O_3$, $Nd_2O_3$, $Pr_2O_3$ or $Ce_2O_3$.

2. The glass frit composition according to claim 1 consisting essentially of in percent by weight from about 28% to about 60% $SiO_2$, from about 3% to about 10.5% ZnO, from about 9% to about 19% $B_2O_3$, up to about 8% $Na_2O$, up to about 6% of each of BaO, SrO, $Al_2O_3$, $TiO_2$ and $ZrO_2$, from about 0.1% to about 15% $K_2O$, from about 0.1% to about 7% $Bi_2O_3$, from about 0.25% to about 4.5% $Li_2O$, from about 0.1% to about 16% of each of $Nb_2O_5$ and $Ta_2O_5$, up to about 5% F, from about 0.1% to about 5% $Sb_2O_3$, up to about 3% of each of CaO, $Mo_2O_3$ and MgO, and from about 0.1% to about 3% of one or more of $La_2O_3$, $Nd_2O_3$, $Pr_2O_3$ or $Ce_2O_3$.

3. The glass frit composition according to claim 2 consisting essentially of in percent by weight from about 30% to about 56% $SiO_2$, from about 4% to about 10% ZnO, from about 10% to about 18% $B_2O_3$, from about 0.1% to about 5% of each of $Na_2O$, $Al_2O_3$, $TiO_2$ and $ZrO_2$, from about 0.25% to about 13.5% $K_2O$, from about 0.25% to about 3% $Bi_2O_3$, from about 0.5% to about 3% $Li_2O$, from about 0.25% to about 11% of $Ta_2O_5$, from about 0.1% to about 11% $Nb_2O_5$, up to about 4% of each of BaO and SrO, from about 0.25% to about 3.5% $Sb_2O_3$, from about 0.1% to about 3.5% F, up to about 2% of each of CaO, $Mo_2O_3$ and MgO, and from about 0.25% to about 2% of one or more of $La_2O_3$, $Nd_2O_3$, $Pr_2O_3$ or $Ce_2O_3$.

4. The glass frit according to claim 1 wherein the $Ta_2O_5$ is present in an amount of from about 0.25% to about 11%.

5. The glass frit according to claim 1 which is substantially free of $Nb_2O_5$.

6. The glass frit according to claim 3 which is substantially free of $Nb_2O_5$.

7. The glass frit according to claim 1 wherein the $Bi_2O_3$ is present in an amount of from about 0.25% to about 3%.

8. The glass frit according to claim 3 which has a coefficient of thermal expansion of from about $65 \times 10^{-7}/°$ C. to about $90 \times 10^{-7}/°$ C.

9. A glass enamel composition comprising the glass frit composition according to claim 1.

10. A glass enamel composition comprising the glass frit composition according to claim 3.

11. A glass enamel composition comprising the glass frit composition according to claim 4.

12. A glass enamel composition comprising the glass frit composition according to claim 5.

13. A glass enamel composition comprising the glass frit composition according to claim 7.

14. A glass enamel composition comprising the glass frit composition according to claim 4 together with a vehicle selected from the group consisting of water miscible vehicle, thermoplastic vehicle, spray vehicle, roller coater vehicle, pad transfer vehicle, UV curable vehicle, and mixtures thereof.

15. A glass enamel composition comprising the glass frit composition according to claim 1 together with a vehicle selected from the group consisting of water miscible vehicle, thermoplastic vehicle, spray vehicle, roller coater vehicle, pad transfer vehicle, UV curable vehicle, and mixtures thereof.

* * * * *